(12) United States Patent
Calabrese

(10) Patent No.: US 6,497,003 B2
(45) Date of Patent: Dec. 24, 2002

(54) FAST-FIT DEVICE FOR FASTENING A MAT TO A CARPET FIXED TO THE FLOOR OF A VEHICLE

(75) Inventor: Rocco Calabrese, Turin (IT)

(73) Assignee: ITW Fastex Italia S.r.l., Strada Settimo (IT)

( * ) Notice: Subject to any disclaimer, the term of this patent is extended or adjusted under 35 U.S.C. 154(b) by 108 days.

(21) Appl. No.: 09/725,177

(22) Filed: Nov. 29, 2000

(65) Prior Publication Data

US 2001/0004784 A1 Jun. 28, 2001

(30) Foreign Application Priority Data

Dec. 2, 1999 (IT) .......................... MI99A2524

(51) Int. Cl.[7] .......................... B62D 25/20; A47G 27/04
(52) U.S. Cl. .......................... 16/4; 24/586.11; 24/595.1; 296/97.23
(58) Field of Search .................... 16/4, 5, 8; 296/97.23; 428/99, 223; 24/586.11, 572.1, 591.1, 595.1, 598.1

(56) References Cited

U.S. PATENT DOCUMENTS

| | | | | |
|---|---|---|---|---|
| 3,114,272 A | * | 12/1963 | Sawyer .......................... 74/564 |
| 4,588,628 A | * | 5/1986 | Roth .......................... 428/99 |
| 4,829,627 A | * | 5/1989 | Altus et al. .......................... 16/4 |
| 4,878,792 A | * | 11/1989 | Frano .......................... 411/339 |
| 5,511,283 A | * | 4/1996 | Hirose .......................... 16/8 |
| 5,775,859 A | * | 7/1998 | Anscher .......................... 411/38 |

* cited by examiner

Primary Examiner—Anthony Knight
Assistant Examiner—Doug Hutton
(74) Attorney, Agent, or Firm—Lowe Hauptman Gilman & Berner, LLP

(57) ABSTRACT

The fastening device has first and second fastening means fittable to the carpet and to the mat and which click together. The first fastening means are defined by a single part having two flanges integral with a hub and which are positioned on opposite sides of the carpet; and one of the flanges is shaped to permit passage through a hole in the carpet by rotating the single part. The second fastening means have a further two flanges integral with two corresponding hubs which fit together in a variable axial position through a hole in the mat to adapt the distance between the further two flanges to the thickness of the mat. The single part carries a male member which clicks inside an elastic female member carried by one of the flanges fitted to the mat.

22 Claims, 2 Drawing Sheets

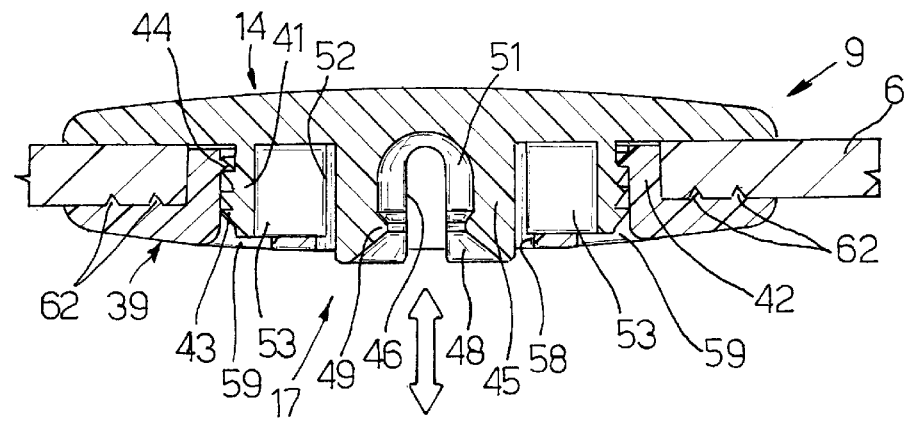
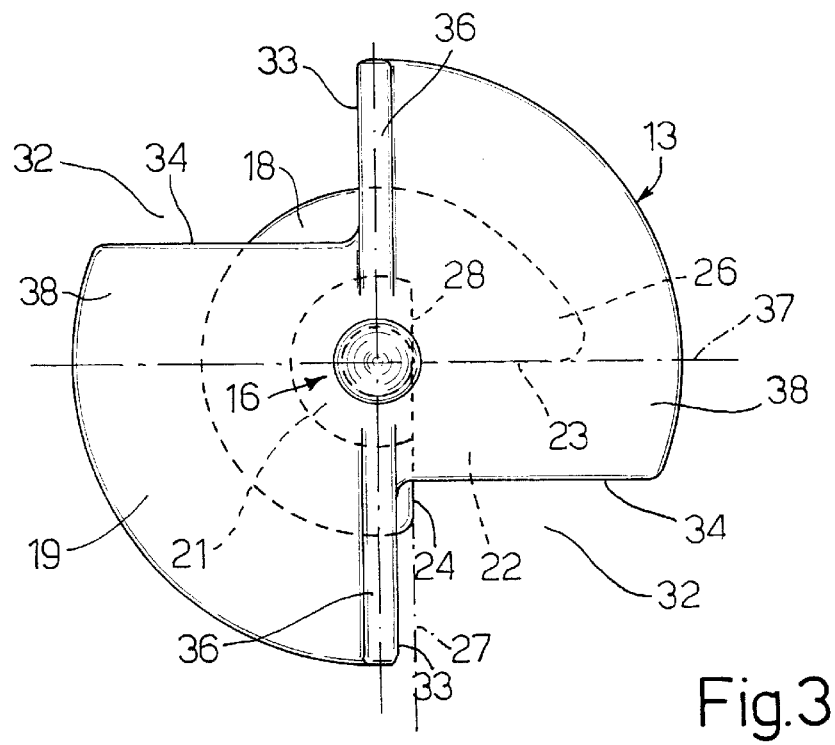
Fig. 2
Fig. 3

FAST-FIT DEVICE FOR FASTENING A MAT TO A CARPET FIXED TO THE FLOOR OF A VEHICLE

The present invention relates to a fast-fit device for fastening a mat to a carpet fixed to the passenger compartment floor of a vehicle.

BACKGROUND OF THE INVENTION

The passenger compartment floor of vehicles, in particular cars, is normally carpeted, and, being subjected to hard wear, the carpet is normally covered with an easy-change mat of synthetic material. When simply placed on top of the carpet with no provision for preventing it from slipping, the mat not only fails to adequately protect the carpet, but is also a source of annoyance to the user.

Various mat fastening devices for preventing the mat from slipping with respect to the carpet are known, and which normally comprise a fairly large number of parts made of plastic material and fitted partly to the carpet and partly to the mat. Such known devices involve several drawbacks.

In particular, being fairly complicated, the parts fitted to the carpet and the mat call for high-cost molds and are not normally suitable for automated assembly; the devices are relatively expensive to produce, also on account of the large number of parts involved; and fitting the parts to the carpet and the mat and then connecting the parts together are fairly complicated time-consuming operations requiring skilled personnel.

SUMMARY OF THE INVENTION

It is an object of the invention to provide a highly straightforward, low-cost fast-fit device for fastening a mat to a carpet, designed to eliminate the aforementioned drawbacks typically associated with known devices.

According to the present invention, there is provided a fast-fit device for fastening a mat to a carpet fixed to the passenger compartment floor of a vehicle; the device comprising first fastening means fittable to said carpet, and second fastening means fittable to said mat; and being characterized in that said first and second fastening means click together.

More specifically, the first fastening means are defined by a single part having two flanges integral with a hub and positioned on opposite sides of said carpet.

BRIEF DESCRIPTION OF THE DRAWINGS

A preferred, non-limiting embodiment of the invention will be described by way of example with reference to the accompanying drawings, in which:

FIG. 2 shows a vertical mid-section of the FIG. 1 device with the mat detached from the carpet;

FIG. 3 shows a top plan view of a FIG. 1 detail.

DETAILED DESCRIPTION OF THE INVENTION

Figure 1:
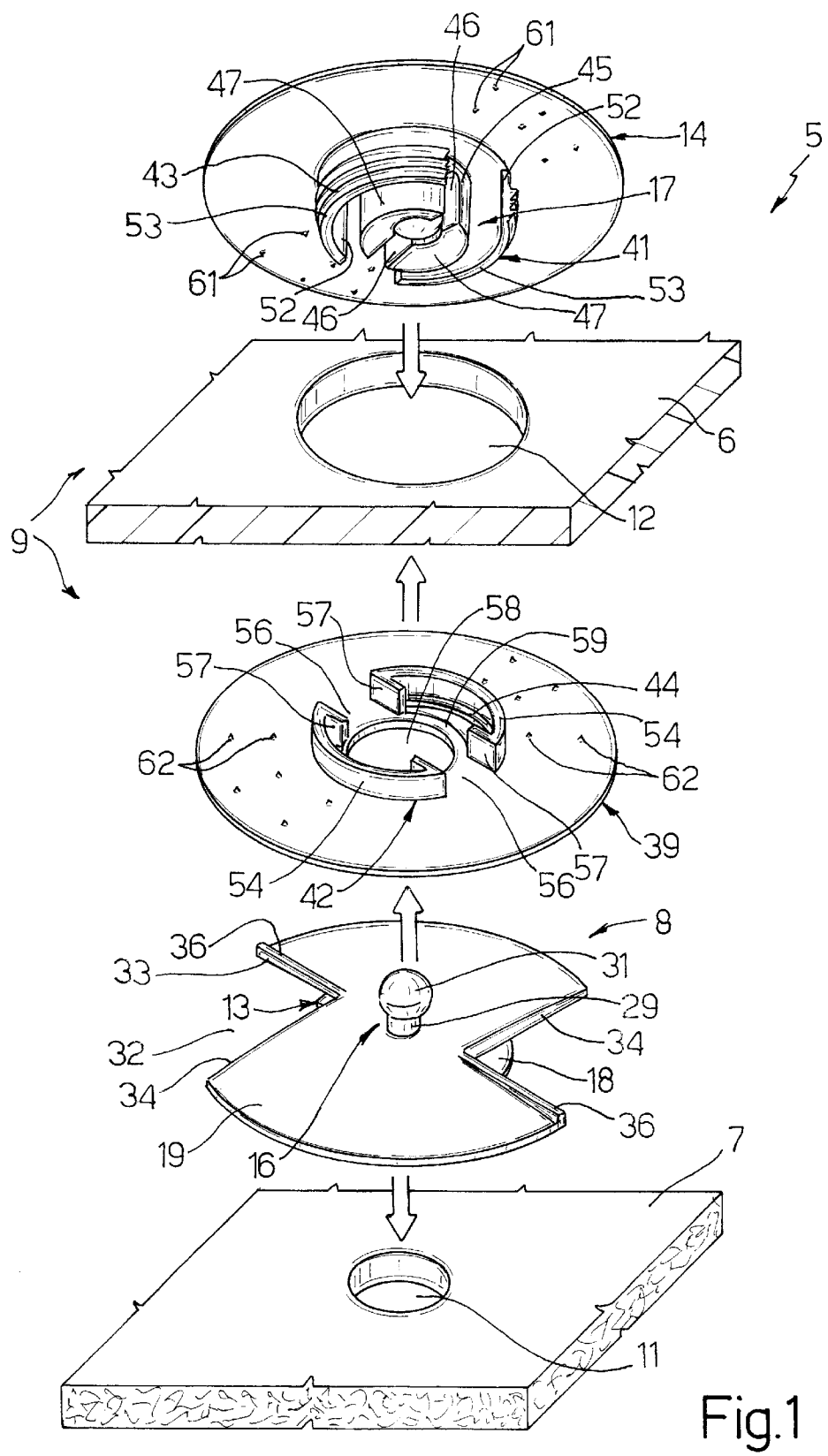
FIG. 1 shows an exploded view in perspective of a device for fastening a mat to a vehicle carpet in accordance with the invention.

Number 5 in FIG. 1 indicates as a whole a device for fastening a mat 6 to a carpet 7 fixed in known manner to the passenger compartment floor of a vehicle, e.g. a car. Carpet 7 is of predetermined thickness and made of relatively soft synthetic or natural fibers. Mat 6 is easily replaceable, is made of relatively compact fibrous or flexible plastic material, and may vary in thickness to some extent, e.g. according to the material of which it is made.

Device 5 comprises first fastening means 8 fittable to carpet 7; and second fastening means 9 fittable to mat 6. According to the invention, fastening means 8 and 9 click together. Carpet 7 has a hole 11 of a predetermined diameter and to which fastening means 8 are fitted; and mat 6 has another hole 12 larger in diameter than hole 11 and to which fastening means 9 are fitted.

Mat 6 obviously has several holes 12, normally at the corners of mat 6; and carper 7 obviously has the same number of holes 11 located accordingly. A respective fastening device 5 is therefore provided for each pair of holes 11, 12. Fastening means 8 and 9 of each device 5 are made of plastic material and formed with respective portions 16 and 17 which click together. As shown more clearly later on, ortion 16 defines a male connecting member, and portion 17 a female connecting member.

More specifically, first fastening means 8 are defined by a single part 13, which comprises two flanges 18 and 19 (see also FIGS. 2 and 3) integral with a substantially cylindrical hub 21 or the same diameter as hole 11. Flanges 18 and 19 are positioned on opposite sides of carpet 7, and, to fit through hole 11, flange 18 is substantially circular and has a diameter larger than and preferably twice that of hole 11.

Flange 18 has a substantially sector-shaped recess or slot 22 having two sides 23 and 24 forming a substantially right angle, and which enables flange 18 to be fitted through hole 11 by rotating part 13. A portion 26, adjacent to side 23, of flange 18 is cam-shaped and increases in diameter, with respect to the diameter of the rest of flange 18, towards side 23 to increase the grip of flange 18 on the surface of carpet 7.

Side 23 of slot 22 is substantially radial, whereas the other side 24 of slot 22 lies in an ideal secant plane 27 of hub 21. Hub 21 has a flat portion 28 along secant plane 27 and which, by virtue of the yield of carpet 7, prevents hub 21, and hence part 13, from rotating with respect to hole 11.

The other flange 19 of part 13 is also circular but larger in diameter than flange 18. Flange 18 is positioned on the underside of carpet 7, while flange 19 is positioned on the topside of carpet 7 and is integral with portion or male connecting member 16. Member 16 is defined by a stem 29 coaxial with hub 21 and having, on top, a substantially hemispherical knob 31 slightly larger in diameter than stem 29. In actual fact, knob 31 is more than hemispherical, so that a reasonable amount of pull releases the click-on connection to female member 17.

Flange 19 has two diametrically opposite recesses or slots 32, each with two sides 33 and 34 at 90° to each other, so that flange 19 is butterfly-shaped. Sides 33 of the two slots 32 are parallel, and each have a rib 36. The two ribs 36 are diametrically opposite and are engaged by a tool to insert flange 18 through hole 11 by rotating part 13.

Preferably, the thickness of flange 19 (FIG. 1) decreases outwards, while rib 36 is of constant thickness equal to that of the central portion of flange 19. Sides 34 of the two slots 32 are offset with respect to a radial plane 37 and form two portions 38 which increase the surface of flange 19 contacting carpet 7. Side 24 partly faces the inside of one of slots 32 (FIG. 3).

Fastening means 9 of mat 6 comprise two parts. The two parts of fastening means 9 are defined by two flanges 14, 39, which are substantially circular, are of the same diameter, and have respective appendixes defined by two hollow hubs 41 and 42 which fit together irreversibly through hole 12 in mat 6 so that flanges 14 and 39 are positioned on opposite sides of mat 6.

Hub 42 has a smooth outer surface of substantially the same diameter as hole 12 in mat 6. Hubs 41 and 42 are coaxial and fit together in varying axial positions to adapt the distance between flanges 14 and 39 to the thickness of mat 6. More specifically, the cylindrical outer surface of hub 41 has serrated teeth 43; and the inner surface of hub 42 has one triangular-section tooth 44 for engaging any one of the gaps between teeth 43.

Flange 14 is positioned on the outer side of mat 6 and has a smooth unbroken outer surface; flange 39 is positioned on the inner side of mat 6; flange 14 carries female connecting member 17, which is defined by a sleeve 45 coaxial with hub 41; sleeve 45 has two axial slots 46 forming two elastic portions 47 of sleeve 45; and the inner surfaces of the two portions 47 have a truncated-cone-shaped lead-in portion 48, an annular trapezoidal-section rib 49, and a seat 51 into which knob 31 of male member 16 clicks.

Hub 41 also has two axial slots 52 forming two cylindrical sectors 53 which are therefore slightly elastic; hub 42 of flange 39 is defined by two cylindrical sectors 54 associated with sectors 53 and separated by two gaps 56; the two ends of each sector 54 each have a stop member in the form of a tab 57 perpendicular to flange 39; and the two tabs 57 facing each gap 56 are parallel to each other.

Each sector 53 of hub 41 fits, with a small amount of circumferential slack, between the two tabs 57 of the corresponding sector 54 of hub 42, so that, in use, tabs 57 limit rotation of flange 14 with respect to flange 39.

Flange 39 has a central hole 58 through which sleeve 45 fits, and which is of such a diameter as to enable the two elastic portions 47 to fit through freely when flanges 14 and 39 are fastened the minimum distance apart as shown in FIG. 2. Flange 39 also has two arc-shaped openings 59 (only one shown in FIG. 1) which are associated with sectors 54 of hub 42, are each located between the respective two tabs 57, and enable sectors 53 of hub 41 to fit through freely when flanges 14 and 39 are fastened as shown in FIG. 2.

Finally, the surface of flange 14 eventually contacting the upper surface of mat 6 has two diametrically opposite groups of six projections 61. Similarly, the surface of flange 39 eventually contacting the lower surface of mat 6 has a further two diametrically opposite groups of six projections 62. The groups of projections 62 on flange 39 are offset angularly, e.g. by 90°, with respect to the groups of projections 61 on flange 14; and, in use, projections 61 and 62 engage and deform the surfaces of mat 6 to prevent any movement of flanges 14 and 39 with respect to the mat.

Fastening device 5 may be used for fitting mat 6 either on-line at the vehicle assembly stage or as an add-on to existing vehicles. In the first case, part 13 and parts or flanges 14 and 39 may be fed by appropriate automatic feeders to an assembly robot; and each part 13, 14, 39 can be aligned automatically on the respective loader by virtue of various radial locating elements, such as sides 33 and 34 of slot 32 on flange 19 of part 13, slots 52 on part 14, and tabs 57 on part 39.

Mat 6, possibly complete with holes 12, may also be supplied in the form of a kit, together with sets of parts 13, 14, 39, for add-on assembly to existing vehicles. For first-time assembly of mat 6 to the passenger compartment of the vehicle, holes 11 are first formed in known manner in carpet 7, in positions corresponding to holes 12 in mat 6. Using an appropriate tool, ribs 36 on part 13 are then engaged and flange 18 rotated through respective hole 11, commencing with cam portion 26. Alternatively, carpet 7 may already be complete with holes 11 with respective parts 13 already inserted. In which case, the kit may simply comprise mat 6 and the pairs of parts 14, 39 to fit inside holes 12.

Whichever the case, hub 42 on part 39 is inserted inside a respective hole 12 in mat 6; each of the two sectors 53 of hub 41 is inserted between the two tabs 57 of a respective sector 54 of hub 42; and parts 14 and 39 are pressed together so that tooth 44 engages one of the gaps between teeth 43, and projections 61 and 62 sink into the thickness of mat 6, so that parts 14 and 39 are connected firmly to each other and to mat 6.

Once pairs of parts 14, 39 are all fitted to mat 6, the mat can be fitted quickly to carpet 7 by placing each female member 17 on top of the corresponding male member 16 and pressing down respective flange 14. To replace a worn mat 6, the mat can be detached quickly from carpet 7 by pulling out each flange 14 to detach female member 17 from the corresponding male member 16.

The advantages, as compared with known devices, of the fast-fit fastening device 5 according to the invention will be clear from the foregoing description. In particular, only a very small number of parts 13, 14, 39 are required; parts 13, 14, 39 are of simple design and can therefore be injection molded using low-cost molds; parts 13, 14, 39 are also designed to enable automatic robot assembly; and device 5 provides for fitting mat 6 quickly with substantially no special tools required.

Clearly, changes may be made to the fastening device as described herein without, however, departing from the scope of the accompanying Claims. For example, in part 13, slot 22 may be sized differently and/or flat portion 28 of hub 21 may be eliminated; and ribs 36 may differ in number, may be arranged in any angular position, and may even be replaced with two projections or two depressions. Hubs 41 and 42 of flanges 14 and 39 may have different numbers of axial slots 52 and gaps 56. And finally, the inner surface of sectors 54 of hub 42 may be provided with teeth, sectors 53 of hub 41 may be provided with only one tooth or with teeth 43, and the male and female members may be inverted.

I claim:

1. A fast-fit device for fastening a mat (6) to a carpet (7) fixed to the passenger compartment floor of a vehicle, the device comprising first fastening member (8) fittable to the carpet (7) and second fastening member (9) fittable to the mat (6), wherein said first and second fastening members (8, 9) click together;

said first fastening member (8) is defined by a single part (13) having first and second flanges (18, 19) integral with a hub (21), said flanges (18, 19) being adapted to be positioned on opposite sides of the carpet (7);

said hub (21) is adapted to engage a hole (11) formed in the carpet (7), said first flange (18) being of such a shape as to permit passage through the hole (11); and said shape is substantially circular, except for a cut-out portion (22), and larger in diameter than the hole (11); said first flange (18) having said cut-out portion (22) permitting passage of said first flange (18) through the hole (11) by means of rotation of said single part (13).

2. A device as claimed in claim 1, wherein said cut-out portion (22) is sector-shaped and defined by two sides (23, 24) forming a substantially right angle; a portion (26), adjacent to a first (23) of said sides (23, 24), of said first flange (18) increasing in diameter towards said first side (23) to increase the surface of said first flange (18) contacting the carpet (7).

3. A device as claimed in claim 2, wherein said hub (21) is substantially cylindrical and has a diameter substantially equal to that of the hole (11); the diameter of said substantially circular first flange (18) being substantially twice that of the hole (11).

4. A device as claimed in claim 2, wherein the other side (24) of said cut-out portion (22) lies in a secant plane (27) with respect to said hub (21), which is substantially cylindrical; said hub (21) having a flat portion (28) along said secant plane (27) to prevent said single part (13) from rotating in the hole (11).

5. A fast-fit device for fastening a mat (6) to a carpet (7) fixed to the passenger compartment floor of a vehicle, the device comprising first fastening member (8) fittable to the carpet (7) and second fastening member (9) fittable to the mat (6), wherein said first and second fastening members (8, 9) click together;

said first fastening member (8) is defined by a single part (13) having first and second flanges (18, 19) integral with a hub (21), said flanges (18, 19) being adapted to be positioned on opposite sides of the carpet (7);

said hub (21) is adapted to engage a hole (11) formed in the carpet (7), said first flange (18) being of such a shape as to permit passage through the hole (11); and said second flange (19) has a radial extent larger than that of said first flange (18);

said device further comprising a female member (17) formed in said second fastening member (9), and a matching male member (16) located on said second flange (19) to be removably held by said female member (17).

6. A device as claimed in claim 5, wherein said second flange (19) has an engaging portion (36) adapted to be engaged by a tool to insert said first flange (18) through the hole (11) by means of said rotation of said single part (13).

7. A device as claimed in claim 6, wherein said second flange (19) has two diametrically opposite cut-out portions (32), each having two sides (33, 34) at substantially 90° to each other.

8. A device as claimed in claim 7, wherein said engaging portion comprises two radial ribs (36), each located on one (33) of said two sides (33, 34) of said two cutout portions (32); said ribs (36) being diametrically opposite each other.

9. A device as claimed in claim 5, wherein said second flange (19) includes a lower surface integral with said hub (21) and an opposite upper surface, said male member (16) extending upwardly, continuously from said upper surface.

10. A device as claimed in claim 5, wherein said second flange (19) is substantially circular and larger in diameter than said first flange (18).

11. A fast-fit device for fastening a mat (6) to a carpet (7) fixed to the passenger compartment floor of a vehicle, the device comprising first fastening member (8) fittable to the carpet (7) and second fastening member (9) fittable to the mat (6), wherein said first and second fastening members (8, 9) click together;

said first fastening member (8) is defined by a single part (13) having first and second flanges (18, 19) integral with a hub (21), said flanges (18, 19) being adapted to be positioned on opposite sides of the carpet (7);

said second fastening member (9) comprises two separate parts having two corresponding fitting portions which fit together through a hole (12) in the mat (6) so that said two parts can be located on opposite sides of the mat (6);

said two parts further have third and fourth flanges (14, 39), respectively; said fitting portions being integral with said third and fourth flanges (14, 39), respectively;

said fitting portions fit together in a variable axial position to adapt the distance between said third and fourth flanges (14, 39) to the thickness of the mat (6); and said fitting portions are defined by first and second hollow hubs (41, 42), respectively, an outer surface of said first hub (41) has serrated axial teeth (43); an inner surface of said second hub (42) having at least one matching tooth (44) engageable with said serrated axial teeth (43).

12. A device as claimed in claim 11, wherein said first hub (41) has at least one axial slot (52) defining a sector (53) of said first hub (41); said sector (53) engaging a corresponding pair of circumferential-stop members (57) carried by said second hub (42).

13. A device as claimed in claim 12, wherein said first hub (41) is carried by said third flange (14) which is adapted to be eventually positioned on the outer side of the mat (6); a female member (17) being carried, concentrically with said first hub (41), by said third flange (14).

14. A device as claimed in claim 13, wherein said second hub (42) is carried by said fourth flange (39) which is adapted to be eventually positioned on the inner side of the mat (6); said fourth flange (39) having a central hole (58) for the passage of said female member (17), and having at least one opening (59) for the passage of said sector (53) of said first hub (41).

15. A device as claimed in claim 11, wherein each of said third and fourth flanges (14, 39) comprises a flat surface for engaging a corresponding surface of the mat (6); at least one of said flat surfaces having projections (61, 62) for deforming the corresponding surface of the mat (6) and preventing any movement of said associated flange (14, 39) along the corresponding surface of the mat (6).

16. A device as claimed in claim 11, wherein said hubs are substantially-cylindrical.

17. A kit, comprising a mat and a fast-fit device for fastening said mat to a carpet fixed to the passenger compartment floor of a vehicle, said device comprising a fastening member fittable to said mat and adapted to be snap-fitted with a matching fastening member fittable to the carpet; wherein said mat has a through hole formed at a location corresponding to the matching fastening member on the carpet;

said fastening member comprises two separate parts having two corresponding fitting portions which fit together through said through hole in said mat so that said two parts can be located on opposite sides of said mat;

said two parts further have first and second flanges, respectively, said fitting portions being integral with said first and second flanges, respectively; and said fitting portions are engageable with each other at a plurality of axially spaced locking positions to adapt the distance between said first and second flanges to the thickness of said mat; at each of said locking positions, said fitting portions are engaged to prevent displacement of one of said parts in a direction away from the other.

18. The kit of claim 17, wherein said fitting portions are defined by first and second hollow hubs, respectively, an outer surface of said first hub has serrated axial teeth; an inner surface of said second hub having at least one matching tooth engageable with said serrated axial teeth.

19. The kit of claim 17, further comprising said matching fastening member being defined by a single part having third and fourth flanges integral with a hub, said third and fourth flanges being adapted to be positioned on opposite sides of the carpet.

20. The kit of claim 19, wherein said hub is adapted to engage a hole formed in the carpet, said third flange being of such a shape as to permit passage through the hole.

21. The kit of claim 20, wherein said shape is substantially circular, except for a cut-out portion, and larger in diameter than the hole; said third flange having said cut-out portion permitting passage of said third flange through the hole by means of rotation of said single part.

22. The kit of claim 20, wherein said fourth flange has a radial extent larger than that of said third flange; said fastening member further comprising a female member, and said matching fastening member further comprising a matching male member extending continuously from an upper surface of said fourth flange away from said third flange and adapted to be removably held by said female member.

* * * * *